US006888718B2

(12) United States Patent
Nakamura

(10) Patent No.: US 6,888,718 B2
(45) Date of Patent: May 3, 2005

(54) MOUNTABLE UNIT LOADING/UNLOADING MECHANISM AND PLATE UNIT

(75) Inventor: Takashi Nakamura, Chiba (JP)

(73) Assignee: Sony Computer Entertainment Inc. (JP)

( * ) Notice: Subject to any disclaimer, the term of this patent is extended or adjusted under 35 U.S.C. 154(b) by 278 days.

(21) Appl. No.: 10/158,627

(22) Filed: May 30, 2002

(65) Prior Publication Data

US 2002/0195913 A1 Dec. 26, 2002

(30) Foreign Application Priority Data

May 31, 2001 (JP) ........................................ 2001-165683

(51) Int. Cl.$^7$ ................................................ G06F 1/16
(52) U.S. Cl. ...................... 361/685; 463/29; D13/199
(58) Field of Search ................................ 361/683–686, 361/724–727; 312/223.1, 294, 223.2, 257.1, 319.1, 319.2; 463/43, 29, 23; D14/365–369; D13/199, 162, 184

(56) References Cited

U.S. PATENT DOCUMENTS

| 4,941,841 | A | * | 7/1990 | Darden et al. ............... 361/685 |
| 5,327,323 | A | * | 7/1994 | Yeom et al. ................. 361/685 |
| D358,141 | S | * | 5/1995 | Pecone et al. ............. D14/367 |
| 5,442,513 | A | * | 8/1995 | Lo .............................. 361/685 |
| 5,682,291 | A | * | 10/1997 | Jeffries et al. .............. 361/685 |
| 5,767,445 | A | * | 6/1998 | Wu ............................ 361/685 |
| 5,921,644 | A | * | 7/1999 | Brunel et al. ............ 312/223.2 |
| 6,272,011 | B1 | * | 8/2001 | Chen .......................... 361/685 |
| 6,421,236 | B1 | * | 7/2002 | Montoya et al. ............ 361/685 |
| 6,487,081 | B2 | * | 11/2002 | Homer et al. ................ 361/730 |
| 6,580,605 | B1 | * | 6/2003 | Kutaragi et al. ............ 361/685 |
| 2002/0122300 | A1 | * | 9/2002 | Nakamura et al. .......... 361/724 |
| 2002/0126454 | A1 | * | 9/2002 | Kutaragi et al. ............ 361/724 |

FOREIGN PATENT DOCUMENTS

| JP | 60-22052 U | 2/1985 |
| JP | 53-64504 U | 5/1987 |
| JP | 63-164288 U | 10/1988 |

* cited by examiner

*Primary Examiner*—Lisa Lea-Edmonds
(74) *Attorney, Agent, or Firm*—Lerner, David, Littenberg, Krumholz & Mentlik, LLP

(57) ABSTRACT

A mountable unit loading/unloading mechanism is provided for loading a hard disk drive unit into and removing a hard disk drive from an opening of a mount assembly. The loading/unloading mechanism includes a stationary plate secured to the hard disk drive unit, and a movable plate that has an elastically displaceable portion and can be slid with respect to the stationary plate in a direction of insertion into the mount assembly and in the opposite direction, which is a removal direction. When the hard disk drive unit is loaded into the mount assembly, the elastically displaceable portion is displaced outwardly and presses against the inner side walls of the mount assembly to lock the hard disk drive unit to the mount assembly. To draw out the hard disk drive unit from the mount assembly, the movable plate is pushed in the insertion direction toward the back of the mount assembly to displace the elastically displaceable portion inwardly, releasing the contact between the inner side walls of the mount assembly and the elastically displaceable portion.

9 Claims, 14 Drawing Sheets

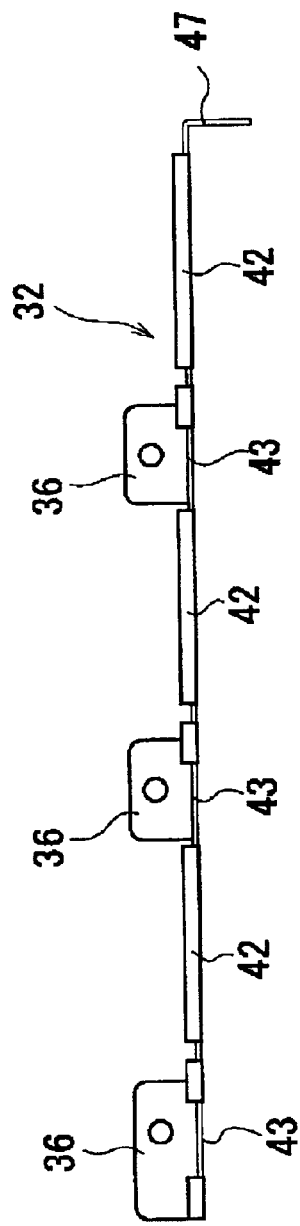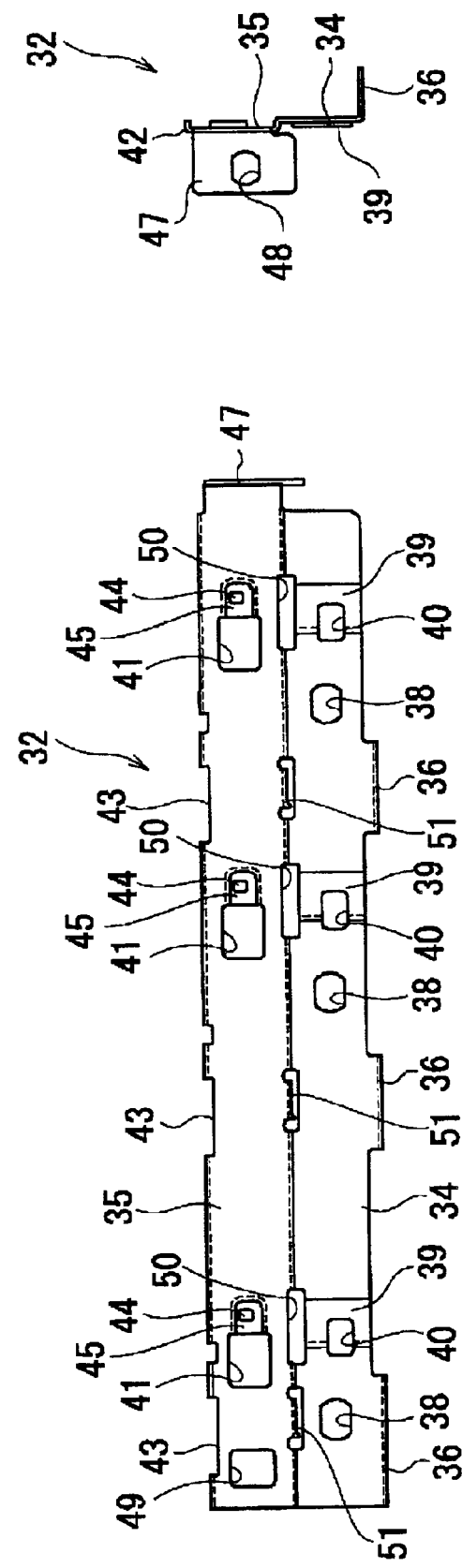

SECTION XIA-XIA

SECTION XIB-XIB

MOUNTABLE UNIT LOADING/UNLOADING MECHANISM AND PLATE UNIT

CROSS-REFERENCE TO RELATED APPLICATIONS

The present application claims priority from Japanese Application No. 2001-165683 filed May 31, 2001, the disclosure of which is hereby incorporated by reference herein.

BACKGROUND OF THE INVENTION

The present invention relates to a mechanism for loading/unloading a mountable unit and, more particularly, to a mechanism for loading/unloading a mountable unit and a plate unit that can be attached to or detached from a mount assembly with a single motion.

In, for example, a hard disk (HD) drive unit, which is a type of magnetic recording disk drive unit, a magnetic head seeks on an HD with a small flight height of a few microns. Hence, a vibration applied to the HD from outside may cause a crash in which the magnetic head comes in contact with the HD. For this reason, a screw is usually installed in a tapped hole provided in a side surface of a hard disk drive unit to secure the hard disk drive unit directly to the frame of a drive unit mounting bay. Directly securing the hard disk drive unit by the screw to the frame makes it possible to lessen the vibration applied to the hard disk drive unit itself even when an external vibration is applied thereto.

However, directly securing the hard disk drive unit to the frame makes it difficult to easily take out the hard disk drive unit from the drive unit mounting bay. The mechanism is especially inconvenient when loading another device in place of the hard disk drive unit into the bay.

A computer used as a server employs a dedicated case capable of accommodating an entire hard disk drive unit to allow the hard disk drive unit to be installed or removed by a single motion by making an arrangement in which each dedicated case can be loaded into the bay. This, however, may be disadvantageous in that the use of dedicated cases adds to cost.

Some dedicated cases have a pair of guide rails provided between wall surfaces in a bay. The guide rails provided, however, may require a relatively large space between each wall surface in the bay and the hard disk drive unit, leading to a problem of an inevitable increased size of the enclosure accommodating the hard disk drive unit. Furthermore, to use the guide rails, every guide rail may be precisely machined to restrain play, resulting in higher manufacturing cost.

SUMMARY OF THE INVENTION

According to the present invention, a stationary plate and a movable plate that is slidable with respect to the stationary plate are provided on a mountable unit. The movable plate has an elastically displaceable portion. To load the mountable unit into the mount assembly of a target apparatus, the elastically displaceable portion provided in the movable plate is displaced outwardly in a lateral direction that is substantially orthogonal to the insertion direction. Then, the mountable unit is pushed in toward the back of the mount assembly, with the displaced elastically displaceable portion being in slidable contact with the inner walls of the mount assembly under pressure. Accordingly, the mountable unit is secured to the mount assembly. To draw the mountable unit out from the mount assembly, the movable plate is pushed in the insertion direction toward the back of the mount assembly to cause the elastically displaceable portion to be displaced inwardly in the lateral direction. This clears the contact between the displaced elastically displaceable portion and the inner walls of the mount assembly, allowing the mountable unit to be drawn out from the mount assembly.

According to an embodiment of the present invention, sliding the movable plate allows a mountable unit to be secured to a mount assembly and the mountable unit to be drawn out from the mount assembly by a single motion, and dedicated accommodating cases are no longer necessary.

BRIEF DESCRIPTION OF THE DRAWINGS

FIG. 7A is a top plan view showing a stationary plate;

FIG. 7B is a front view showing the stationary plate;

FIG. 7C is a right end view showing the stationary plate;

DETAILED DESCRIPTION

Outline of the Embodiment

According to the present embodiment, to install a mountable unit on a mount assembly formed in a target apparatus, a plate unit equipped with a stationary plate and a movable plate that is slidable with respect to the stationary plate and has an elastically displaceable portion is attached to the mountable unit, and the elastically displaceable portion is displaced outward or inward by sliding the movable plate. To set the mountable unit onto a mount assembly, the mountable unit is pushed in toward the rear, with the elastically displaceable portion being displaced outward and pressed against the inner wall of the mount assembly, thereby fixing the mountable unit in the mount assembly. To draw the mountable unit out of the mount assembly, the elastically displaceable portion is displaced inward, and the displaced elastically displaceable portion is released from the contact with the inner wall of the mount assembly so as to be able to draw the mountable unit out of the mount assembly. Thus, the mountable unit can be installed or removed by a single motion.

With reference to the accompanying drawings, detailed descriptions will now be given of an example wherein a plate unit in accordance with the present invention is attached to a hard disk drive unit (mountable unit), and a hard disk drive unit loading/unloading mechanism on which the plate unit has been attached is detachably installed on an entertainment apparatus (a target object) constituting an entertainment system.

Schematic Configuration of the Entertainment System

Figure 1:
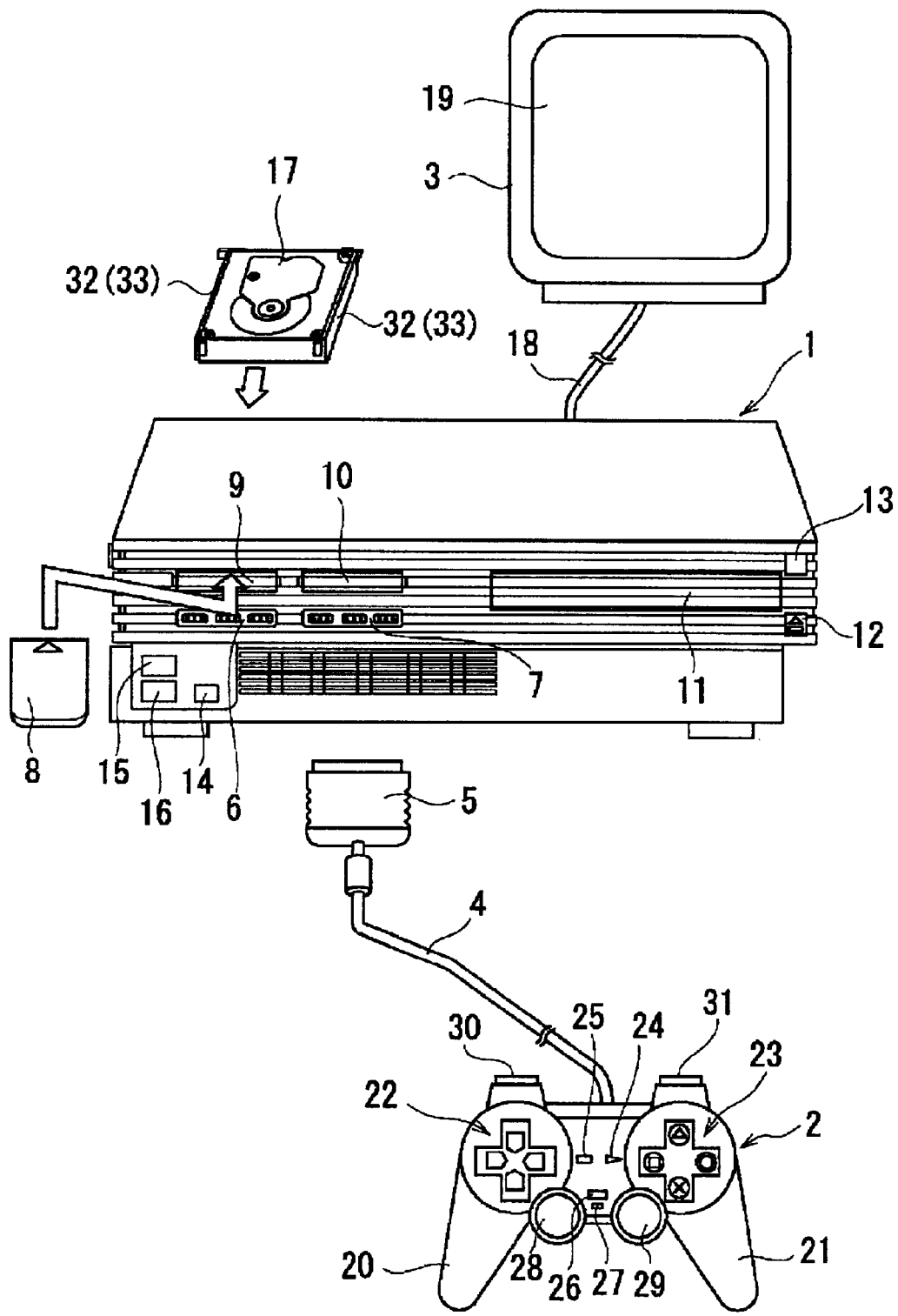
FIG. 1 is a diagram showing a schematic configuration of an entertainment system.

Referring to FIG. 1, the entertainment system includes an entertainment apparatus 1 serving as electronic equipment, a controller 2 serving as an operation terminal connected to the entertainment apparatus 1, and a television monitor 3. The entertainment apparatus 1 is capable of executing a variety of television (or video) games, creating or editing electronic mail, browsing web pages, and reproducing movies and music. The monitor apparatus 3 displays game contents, electronic mail, web pages, movies, etc. and also outputs sound.

Entertainment Apparatus

Referring to FIG. 1, the entertainment apparatus 1 is capable of executing games, creating or editing electronic mail, and a variety of types of processing for browsing web pages according to application programs for games, electronic mail, and web browsers, and commands from an operator input through the controller 2. The entertainment apparatus 1 is also capable of reproducing or decoding the audio data recorded on CDs or the video and audio data of movies or the like recorded on DVDs. The application programs are read out from recording media, such as optical disks or semiconductor memories, including, for example, CD-ROMs and DVD-ROMs, or downloaded through an intermediary transferring media such as a telephone line (subscriber line), a LAN, a CATV network, and a communications satellite network.

The front surface of the entertainment apparatus 1 primarily has two controller ports 6 and 7 to which a connector 5 provided on the distal end of a cable 4 connected to the controller 2 is detachably attached, memory card slots 9 and 10 to which a memory card 8 is detachably inserted, a disc tray 11 in which an optical disc, such as a DVD-ROM or CD-ROM, is loaded, an opening/closing button 12 for opening or closing the disc tray 11, an ON/Standby/Reset button 13 for turning power ON, standby, and resetting a game, an Institute of Electrical and Electronics Engineers (IEEE) 1394 connecting terminal 14, and two universal serial bus (USB) connecting terminals 15 and 16.

The rear surface of the entertainment apparatus 1 has a power switch, an audio and video output terminal (AV multi-output terminal), an optical digital output terminal, and an AC power input terminal, which are not shown. The entertainment apparatus 1 is further provided with an extension bay for accommodating an accessory device, such as a hard disk drive unit 17, in the main body of the apparatus.

Television Monitor Unit

Referring to FIG. 1, the television monitor 3 is connected via a cable 18 to the audio and video output terminal provided on the rear surface of the entertainment apparatus 1. A monitor screen 19 of the television monitor 3 displays the foregoing game contents, electronic mail, web pages, movies, etc. Sounds of games or the like are output from the speaker (not shown) of the television monitor 3.

Controller

As shown in FIG. 1, the controller 2 includes a controller main body having a left handle 20 and a right handle 21 that an operator can hold while controlling the controller 2. The controller 2 also has diverse control buttons on the upper surface or the front surface of the controller main body. The left top surface of the controller main body has up/down and right/left directional instruction keys 22 operated by an operator to, for example, move game characters up/down or right/left on the monitor screen 19 in a video game, move a character input cursor up/down or right/left on an electronic mail creating screen, scroll pages while browsing web pages, or move a cursor on a screen up/down or right/left. The directional instruction keys 22 are operated by the left thumb when the operator holds the controller by both hands.

The right top surface of the controller main body is provided with four instruction buttons 23 to which different functions are assigned by, for example, an application program. These instruction buttons 23 are assigned, for example, a function for specifying the display of a menu, a function for specifying the cancellation or the like of a selected item, a function for specifying the confirmation of a selected item, and a function for specifying display/non-display of contents or the like.

Provided at the center of the top surface of the controller main body are a start button 24 for instructing the start of a game or display of an electronic mail screen, the start of reproduction of a movie or music, or a pause; a selector button 25 for instructing a menu display or an operation panel display on the monitor screen 19; a mode selector switch 26 for selecting an operation mode; a lamp indicator 27 for displaying a selection mode; and right and left analog controllers 28 and 29 for performing joy stick operations. The front surface of the controller main body is provided with, for example, right and left pushbuttons 30 and 31 that are pressed by right and left forefingers.

Hard Disk Drive Unit Loading/Unloading Mechanism

Figure 2:
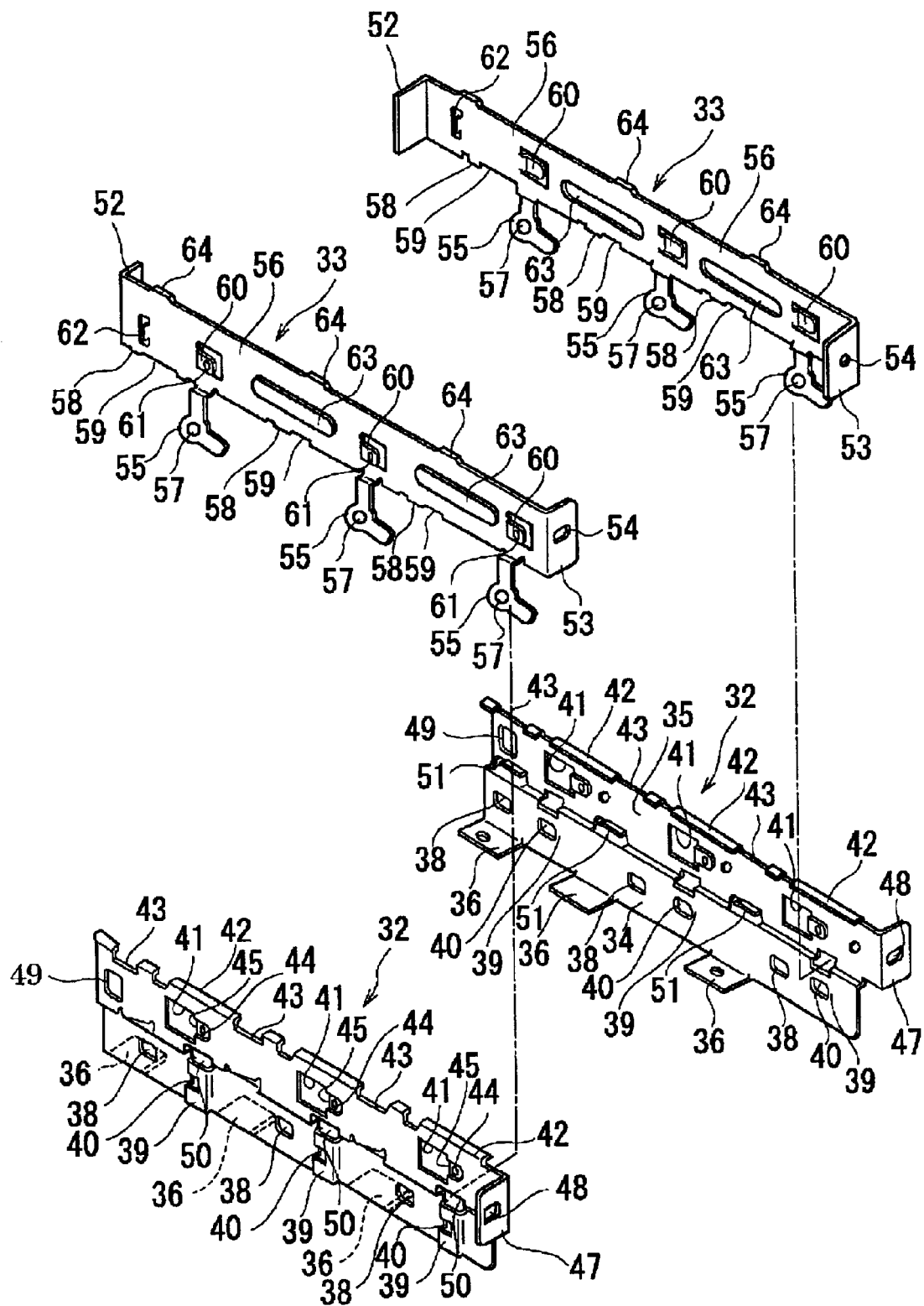
FIG. 2 is a partial exploded view of a mechanism for loading/unloading a mountable unit.

The hard disk drive unit loading/unloading mechanism is configured to enable a hard disk drive unit 17 to be loaded into or unloaded from the extension bay of the entertainment apparatus 1 by a single motion. Referring to FIG. 1 and FIG. 2, the hard disk drive unit loading/unloading mechanism is constituted by a plate unit equipped with a stationary plate 32 secured to the hard disk drive unit 17 and a movable plate 33 slidably attached to the stationary plate 32. As will be discussed hereinafter, by sliding the movable plate 33 with respect to the stationary plate 32, the hard disk drive unit 17 can be locked to or unlocked from the extension bay of the entertainment apparatus 1. In other words, the plate unit acts as a unit that locks or unlocks the hard disk drive unit 17 to or from the extension bay. At least one of the stationary plate 32 and the movable plate 33 may be formed of a magnetic shield member.

Stationary Plate

Figures 3A, 3B:
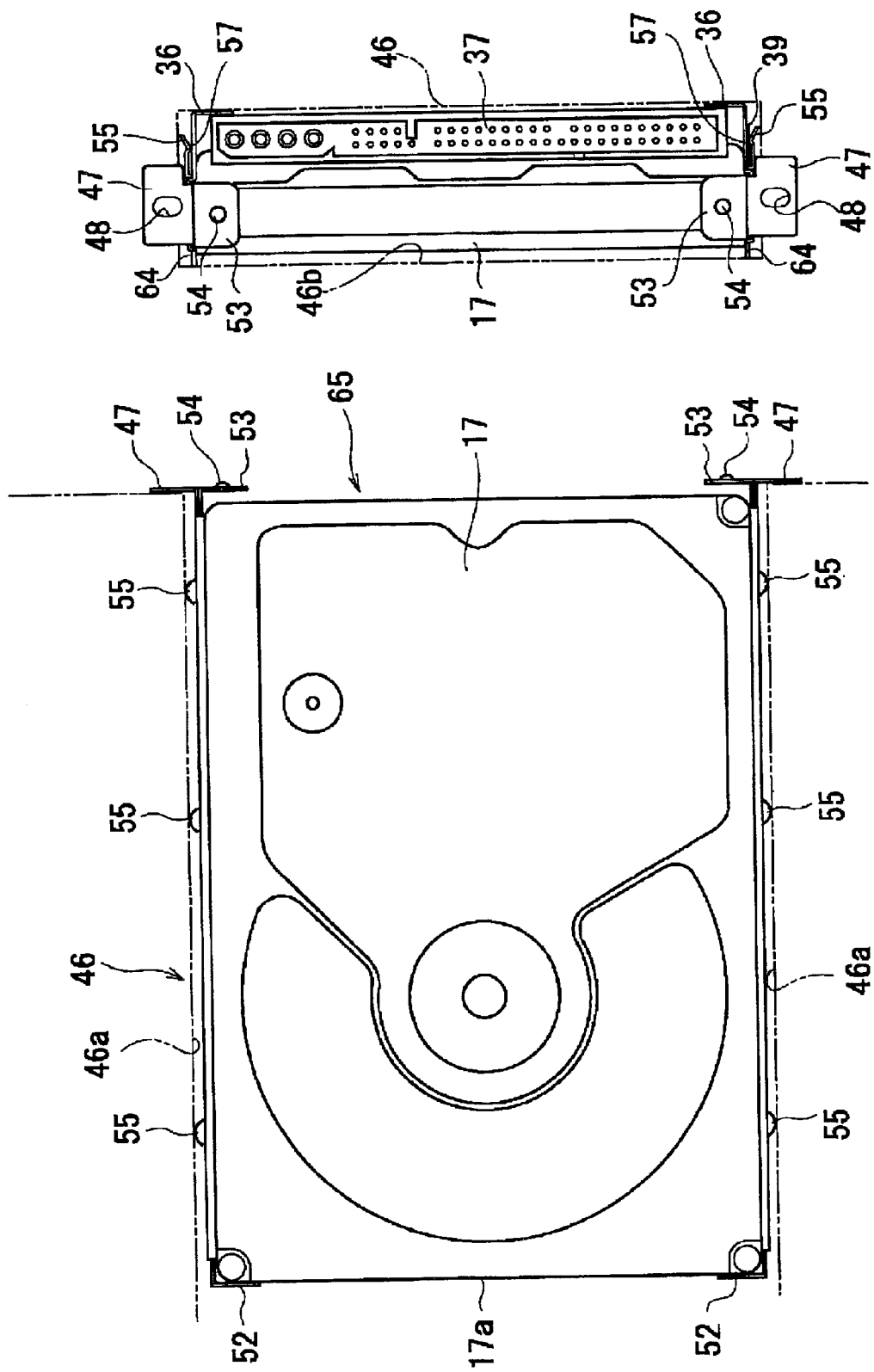
FIG. 3A is a top plan view showing the mechanism for loading/unloading a mountable unit in a state in which a movable plate has been drawn toward the front to displace the elastically displaceable portion outward.
FIG. 3B is a right end view showing the mechanism for loading/unloading a mountable unit in a state in which the movable plate has been drawn toward the front to displace the elastically displaceable portion outward.
Figure 4:
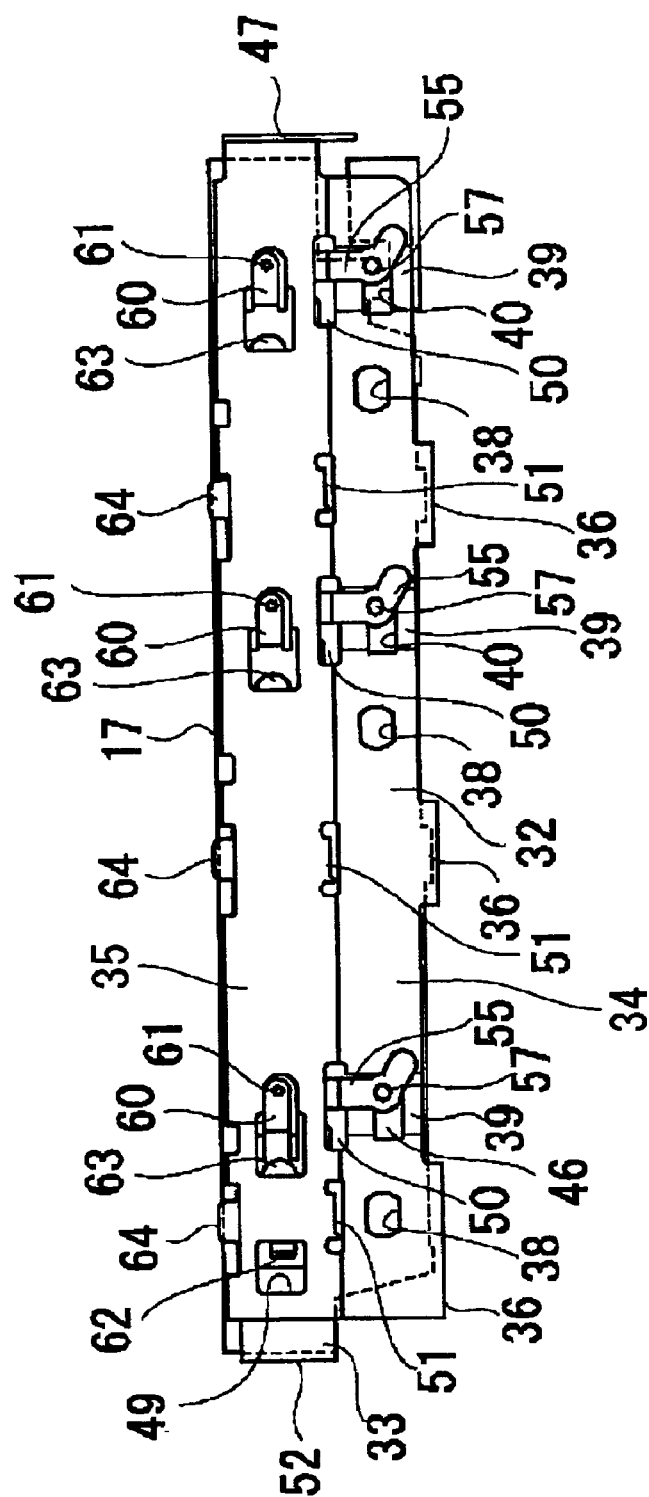
FIG. 4 is a side view showing the mechanism for loading/unloading a mountable unit in a state in which the movable plate has been drawn toward the front to displace the elastically displaceable portion outward.

Referring to FIG. 2 through FIG. 4, stationary plates 32 are secured by screws to both side surfaces of the hard disk drive unit 17, the normal of which are substantially orthogonal to the direction in which the hard disk drive unit 17 is inserted. The stationary plates 32 thus act as guides for directing the slide motion of the movable plates 33. As shown in FIG. 3A, FIG. 3B, and FIG. 7A through FIG. 7C, the stationary plates 32 are formed of metal plates provided to substantially cover the entire side surface of the hard disk drive unit 17. Each of the stationary plates 32 is divided into a lower plate 34 and an upper plate 35 by a bent portion formed at a substantially middle position in the height direction, that is, the thickness direction of the hard disk drive unit 17. The upper plate 35 is offset outward with respect to the lower plate 34. The movable plate 33 is disposed in the gap formed between the hard disk drive unit 17 and the outwardly offset upper plate 35.

Referring to FIG. 4 and FIGS. 7A through 7C, the lower plate 34 is provided with a plurality of tongues 36 for supporting the bottom surface of the hard disk drive unit 17. The tongues 36 are provided at the bottom edge of the lower plate 34 such that they are substantially orthogonal with respect to the lower plate 34. The tongues 36 are provided in the lower plate 34 at the insertion end of the hard disk drive unit 17, at a position close to the middle, and at a position close to the rear insertion end where an interface connecting connector 37 is provided, as shown in FIG. 3B.

The lower plate 34 is further provided with plate fixing holes 38 for securing the stationary plate 32 to the hard disk drive unit 17 by tightening screws in the holes formed in a side surface of the hard disk drive unit 17. The plate fixing holes 38 are formed to match the tapped holes provided in the hard disk drive unit 17, and are formed to be slots so as to permit alignment with the tapped holes.

The lower plate 34 is provided with slide guides 39 for guiding the sliding travel of elastically displaceable portions 55 provided on the movable plate 33, which will be discussed hereinafter. Referring to FIG. 2, the slide guide 39 provided on the right stationary plate 32 (i.e., the stationary plate 32 drawn to the right in the drawing) is a flat plane, while the slide guide 39 provided on the left stationary plate 32 bulges toward the opposite side from the side opposing the hard disk drive unit 17.

The slide guides 39 serve to guide the sliding travel of the elastically displaceable portions 55, and also to cause the elastically displaceable portions 55 to move outward. That is, the elastically displaceable portions 55 are moved away from the hard disk drive unit 17 by coming in contact with the slide guides 39 via protuberances 57 which are provided near the distal ends of the elastically displaceable portions 55. Especially in the case of the left stationary plate 32, the protuberance 57 rides on the bulging slide guide 39, so that the left elastically displaceable portion 55 is displaced further outward relative to the right elastically displaceable portion 55. As will be discussed hereinafter, the outward displacement of the elastically displaceable portion 55 causes the hard disk drive unit 17 to be locked in the extension bay of the entertainment apparatus 1. One of the slide guides 39 is formed to have a bulging shape such that the elastically displaceable portion 55 rides on the slide guide 39 and is displaced outward so as to push the hard disk drive unit 17 to a position at one side in the extension bay of the entertainment apparatus 1.

The slide guides 39 are provided with relief holes 40 for setting the protuberances 57 and the slide guides 39 in a non-contact state when there is no need to displace the elastically displaceable portions 55 outward, or when the hard disk drive unit 17 is drawn out of the extension bay. Entry of the protuberances 57 of the elastically displaceable portions 55 into the relief holes 40 causes the elastically displaceable portions 55 to be displaced inward to move toward the hard disk drive unit 17. As will be discussed hereinafter, the inward displacement of the elastically displaceable portions 55 unlocks the hard disk drive unit 17 from the extension bay of the entertainment apparatus 1. The slide guides 39 are provided in the lower plate 34 at a position close to the insertion end of the hard disk drive unit 17, at a position close to the middle, and at a position close to the rear insertion end, that is, the positions near the elastically displaceable portions 55.

Figure 8:
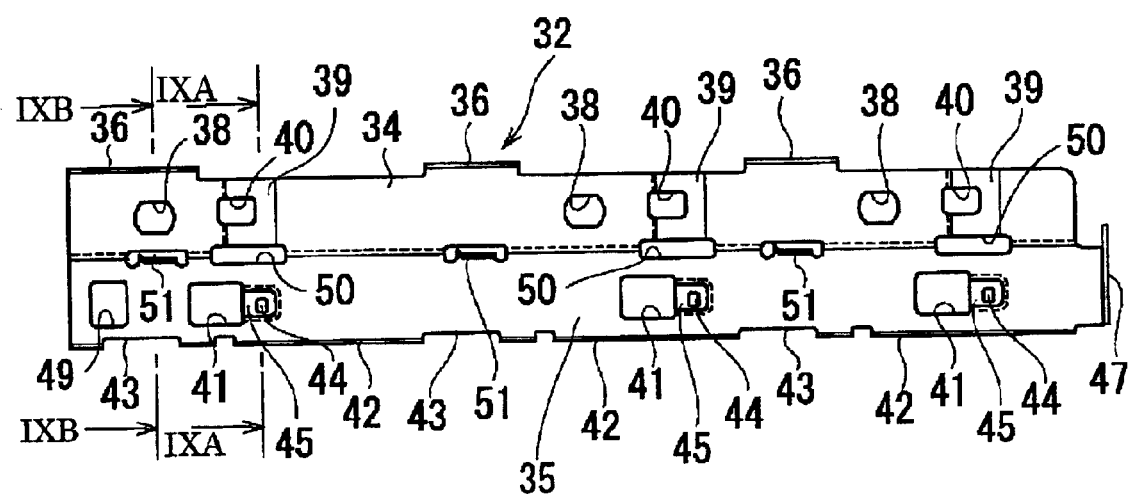
FIG. 8 is a front view showing the stationary plate as observed from a side opposing a hard disk.
Figure 9A:
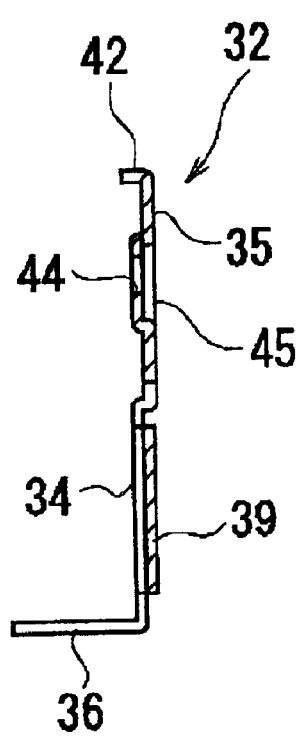
FIG. 9A is an enlarged sectional view showing the stationary plate, the view being taken at the line IXA—IXA shown in FIG. 8.
Figure 9B:
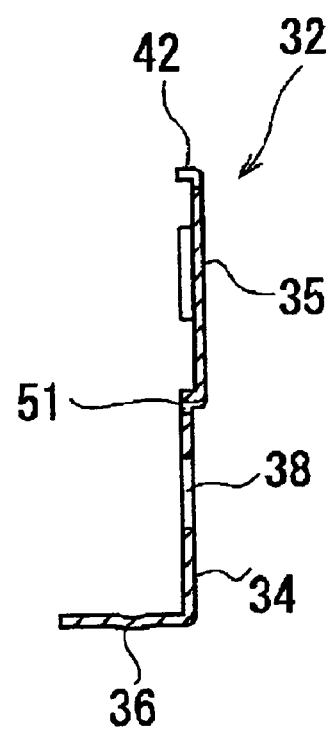
FIG. 9B is an enlarged sectional view showing the stationary plate, the view being taken at the line IXB—IXB shown in FIG. 8.

Referring to FIG. 8 and FIGS. 9A and 9B, the upper plate 35 is provided so that it is slightly offset with respect to the lower plate 34 in a direction away from the hard disk drive unit 17. The upper plate 35 is provided with insertion holes 41 for plate fixing arms 60 (shown in FIG. 2) to face an outer surface on the opposite side from the surface opposing the hard disk drive unit 17. The plate fixing arms 60 are the plate fixing members provided on the movable plate 33, which will be discussed hereinafter.

As shown in FIG. 2 and FIGS. 9A and 9B, the free edge portion of the upper plate 35 is provided with short flanges 42 formed lengthwise and bent substantially at right angles toward the hard disk drive unit 17. The flanges 42 have guide grooves 43 for guiding slide guide tabs (or protruding tabs) 64 provided on the movable plate 33, which will be discussed hereinafter. The guide grooves 43 are formed by cutting off a part of the flanges 42, and are provided at the positions where the slide guide tabs 64 slide. As will be discussed later, the slide guide tabs 64 have a function of locking the hard disk drive unit 17 in or unlocking the hard disk drive unit 17 from the extension bay of the entertainment apparatus 1. As the slide guide tabs 64 slide up or down in the guide grooves 43, the mode is switched between a locking mode and an unlocking mode.

Referring to FIG. 7A through FIG. 9B, the upper plate 35 further has positioning holes or hole-shaped positioning portions 44. Plate positioning protuberances or protuberance-shaped positioning portions 61, which are formed in the vicinity of the distal ends of the plate fixing arms 60 (shown in FIG. 2) facing the outer surface of the upper plate 35 via the insertion holes 41, are inserted and engaged in the positioning holes 44. The engagement of the plate positioning protuberances 61 with the positioning holes 44 locks the movable plate 33 with respect to the stationary plate 32. The peripheral edge portions of insertion holes 41 where the positioning holes 44 are formed are provided with recessed portions 45 that are recessed toward the hard disk drive unit 17 to match the shapes of the distal ends of the plate fixing arms 60, as shown in FIGS. 9A and 9B.

As shown in FIG. 2 and FIG. 3, the upper plate 35 is provided with flanges 47 for securing the stationary plate 32 to the opening peripheral edge portion of a mount assembly 46, serving as an extension bay of the entertainment apparatus 1, when the hard disk drive unit 17 is mounted and fixed in the mount assembly 46. The flanges 47 have screw mounting holes 48 located at positions opposing tapped holes (not shown) formed in the opening peripheral edge portions of the mount assembly 46.

Referring to FIG. 2 and FIG. 4, the upper plate 35 further has a slide restricting hole 49 for restricting the sliding movement of the movable plate 33. The slide restricting hole 49, which is substantially rectangular, is formed at a position close to the insertion end of the hard disk drive unit 17. A slide positioning piece 62 provided on the movable plate 33 comes in contact with an edge of the slide restricting hole 49 when the movable plate 33 is pushed in the insertion direction, thereby restricting the slide stroke of the movable plate 33. The slide positioning piece 62 abuts against the edge of the slide restricting hole 49 only when the movable plate 33 is pushed in the insertion direction to draw out the hard disk drive unit 17 from the mount assembly 46.

As shown in FIG. 4 and FIGS. 7A through 7C, the bent portion serving as the connecting portion of the lower plate 34 and the upper plate 35 has insertion holes or openings 50 in which the elastically displaceable portions 55 of the movable plate 33 are inserted so as to make them face the slide guides 39. The bent portion is also provided with movable plate lifting pieces 51 for raising or lowering the movable plate 33, which will be discussed later, in a vertical direction substantially orthogonal to the direction in which the hard disk drive unit 17 is inserted, as shown in FIG. 2, FIG. 8, and FIG. 9B. One end of each of the movable plate lifting pieces 51 is tapered for smooth lifting or lowering of the movable plate 33. As the movable plate 33 is raised or lowered, the slide guide tabs 64 are vertically displaced in the guide grooves 43, thereby locking or unlocking the hard disk drive unit 17 to or from the extension bay of the entertainment apparatus 1. The upper surface of the movable plate lifting piece 51 functions as a supporting surface for supporting the movable plate 33.

Movable Plate

Referring to FIG. 2 through FIG. 4, the movable plate 33 provided between the stationary plate 32 and the hard disk drive unit 17 is slidable in the direction in which the movable plate 33 is inserted into the mount assembly 46 and also in the opposite direction in which the movable plate 33 is drawn out of the mount assembly 46. The movable plate 33 is formed of an elongated main body plate 56 having a width slightly smaller than the width of the upper plate 35 in the height direction, and a slide end positioning piece 52 and a slide operating piece 53 that are bent substantially at right angles toward the hard disk drive unit 17 at both lengthwise ends of the main body plate 56.

As shown in FIGS. 3A and 3B, when the movable plate 33 is pulled in the pulling out or removal direction (toward the right in FIG. 3A), that is the direction toward the side of the interface connecting connector 37, the slide end positioning piece 52 comes in contact with an insertion distal end surface 17a of the hard disk drive unit 17 so as to restrict the slide start end position of the movable plate 33 in the pulling out direction.

The slide operating piece 53 provided on the front end in the direction in which the hard disk drive unit 17 is pulled out functions as an operating piece operable by a user's hand to slide the movable plate 33. This slide operating piece 53 is provided with a protuberance 54 shaped like a small semisphere that projects in the pulling out direction.

Figure 10C:
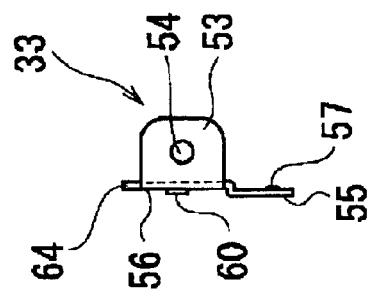
FIG. 10C is a right end view showing the movable plate.
Figure 10A:
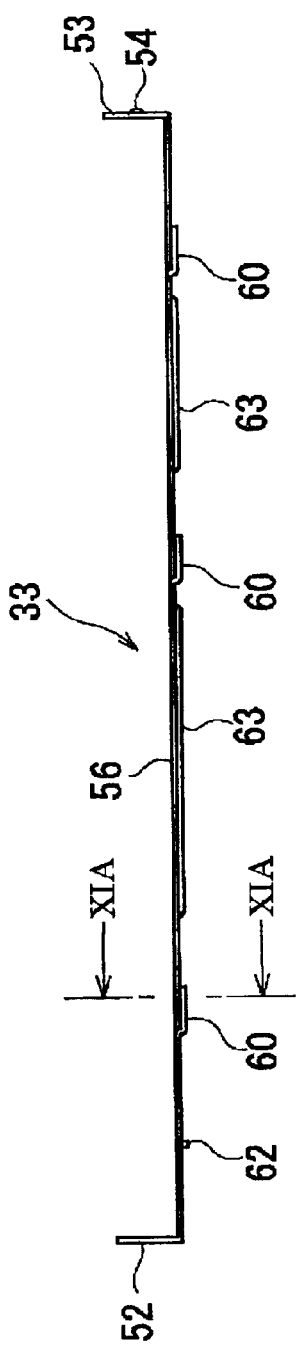
FIG. 10A is a top plan view showing a movable plate.
Figure 10B:
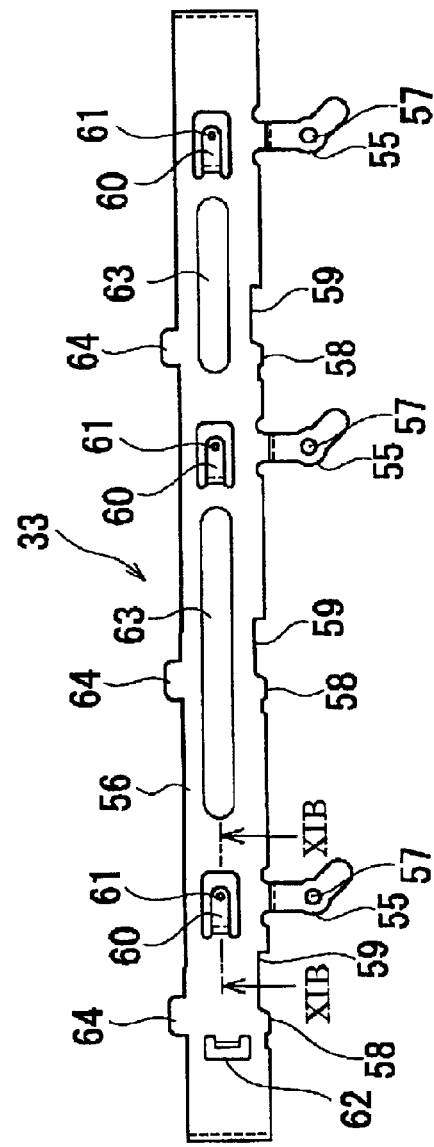
FIG. 10B is a front view showing the movable plate.
Figure 11A:
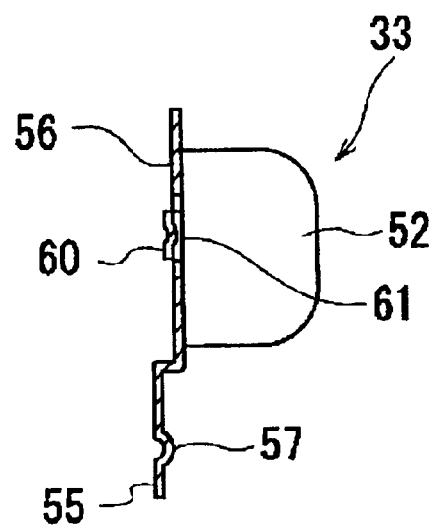
FIG. 11A is an enlarged sectional view showing the movable plate, the view being taken at the line XIA—XIA shown in FIG. 10.
Figure 11B:
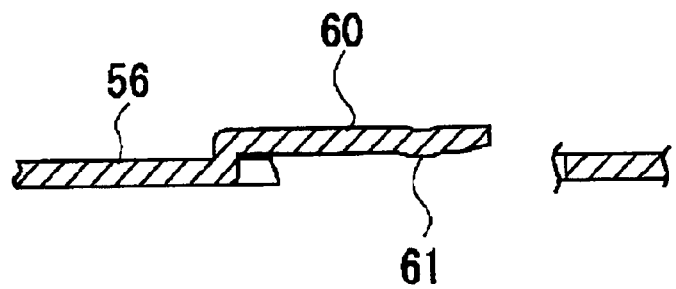
FIG. 11B is an enlarged sectional view showing the movable plate, the view being taken at the line XIB—XIB shown in FIG. 10.

Referring to FIG. 2 and FIG. 4, the lower edge of the main body plate 56 has the elastically displaceable portions 55. The elastically displaceable portions 55 are inserted through the insertion holes 50 formed in the stationary plate 32 and face the outer surface of the stationary plate 32. The elastically displaceable portions 55 extend downward, and are offset in the direction away from the hard disk drive unit 17 with respect to the main body plate 56, as shown in FIGS. 10A through 10C. The elastically displaceable portions 55 are formed into tongues with their distal ends bent aslant. The bent distal end portions of the elastically displaceable portions 55 are provided with protuberances 57 projecting toward the hard disk drive unit 17, as shown in FIGS. 11A and 11B. As the protuberances 57 contact or ride on the slide guides 39, the elastically displaceable portions 55 are displaced outward.

Referring to FIG. 2 and FIGS. 10A through 10C, the lower edge of the main body plate 56 has plate lifting protuberances 58. The plate lifting protuberances 58 ride on movable plate lifting pieces 51 provided on the stationary plate 32 and raise the movable plate 33. More specifically, the bottom surfaces of the plate lifting protuberances 58 act as supported surfaces with respect to the movable plate lifting pieces 51. Relief grooves 59 are provided adjacent to the plate lifting protuberances 58 to prevent contact with the movable plate lifting pieces 51 provided on the stationary plate 32 when the movable plate 33 is slid in the pulling out direction.

The main body plate 56 is further provided with plate fixing arms 60, which are plate fixing members. Referring to FIG. 11B, the plate fixing arms 60 are formed by bending parts of the main body plate 56 so as to shape them into cantilever arms with free distal ends. The plate fixing arms 60 jut outwardly substantially in parallel to the main body plate 56. The distal ends of the plate fixing arms 60 are provided with the plate positioning protuberances 61 that engage with the positioning holes 44 formed in the stationary plate 32. The plate positioning protuberances 61 are formed into semispheres bulging inwardly and opposing the hard disk drive unit 17.

As shown in FIG. 2 and FIGS. 10A through 10C, the main body plate 56 is provided with the slide positioning piece 62 facing the slide restricting hole 49 of the stationary plate 32. The slide positioning piece 62 is formed by cutting and outwardly bending a part of the main body plate 56. The slide positioning piece 62 faces the slide restricting hole 49 and engages with a peripheral edge thereof so as to restrict the slide end position in the direction in which the movable plate 33 is pushed.

The main body plate 56 is provided with slide guide projections 63 that contact the inner surfaces of the stationary plates 32 and function as the slide guides for the stationary plates 32. Each of the slide guide projections 63 juts out to oppose the stationary plate 32 and is formed as an elongated projection whose both lengthwise ends are arcuate. The flat planes of the slide guide projections 63 guide the sliding travel of the movable plates 33 with respect to the stationary plates 32 by maintaining slidable surface contact with the inner surfaces of the stationary plates 32. Providing the slide guide projections 63 on the movable plates 33 makes it possible to easily stamp the movable plates 33 out in a stamping process and to enhance the rigidity of the movable plates 33 themselves.

The upper edges of the main body plates 56 have the slide guide tabs 64 facing the guide grooves 43 provided in the stationary plates 32. The slide guide tabs 64 travel by being guided by the guide grooves 43 when the movable plates 33 are slidably moved. Referring to FIG. 3, when the movable plates 33 are slid in the pulling out direction, the slide guide tabs 64 jut out upwardly, i.e., toward the height direction of the hard disk drive unit 17, so as to be pressed into contact with an inner upper wall 46b of the mount assembly 46. This contact causes the hard disk drive unit 17 to be locked in the mount assembly 46.

Figure 12:
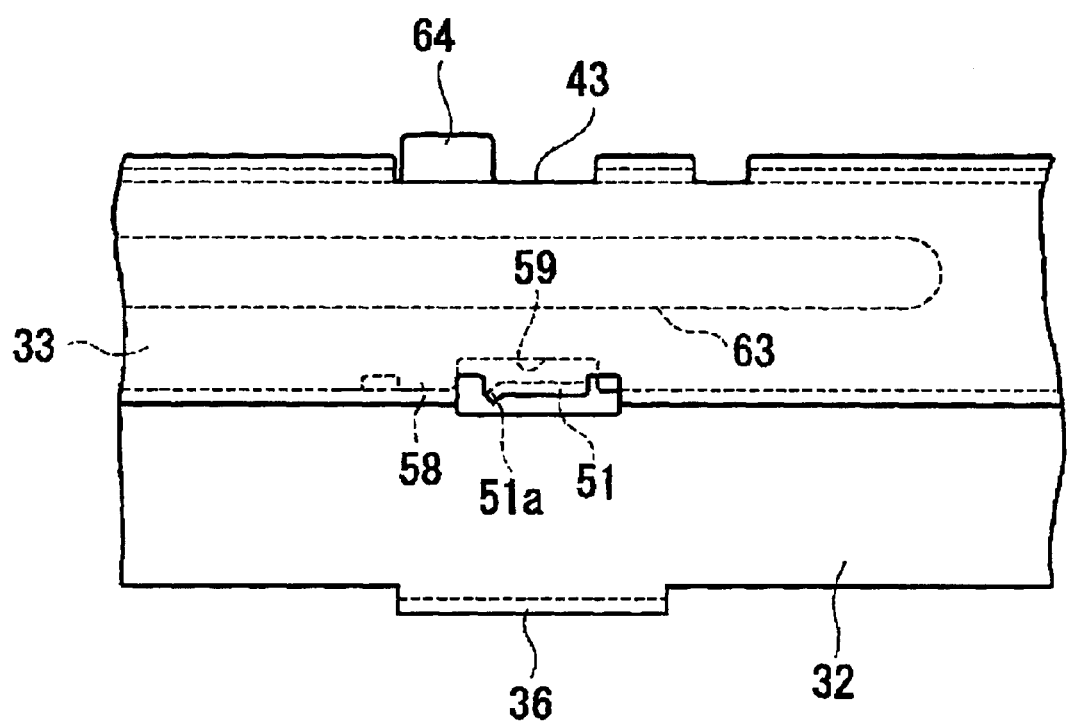
FIG. 12 is an enlarged top plan view showing an essential section in which a plate lifting protuberance is not in contact with a movable plate lifting piece in a state wherein the movable plate has been slid toward the back of the mount assembly.

The movable plates 33 constructed as described above are slidable with respect to the stationary plates 32 in the direction in which the movable plates 33 are inserted into the mount assembly 46 and also in the opposite direction in which the movable plates 33 are pulled out from the mount assembly 46. The movable plates 33 are also movable in the vertical direction substantially orthogonal to the aforesaid sliding directions. More specifically, when the movable plate 33 is slid in the pulling out direction (direction B in FIG. 13) from the state in which the plate lifting protuberance 58 provided on the movable plate 33 is not in contact with the movable plate lifting piece 51 provided on the stationary plate 32, as shown in FIG. 12, the plate lifting protuberance 58 comes in contact with a tapered portion 51a of the movable plate lifting piece 51. Then, as indicated by an arrow C in FIG. 14, the plate lifting protuberance 58 rises along the slope of the tapered portion 51a until it finally climbs up the tapered portion 51a.

Figure 14:
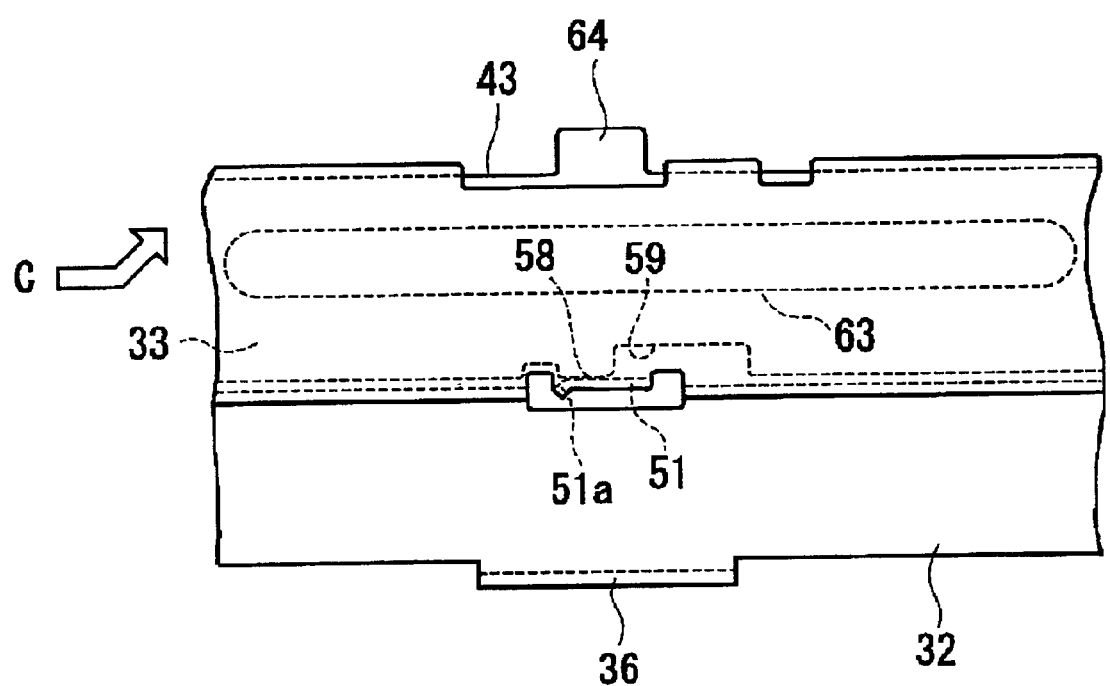
FIG. 14 is an enlarged top plan view of an essential section in a state wherein the plate lifting protuberance has ridden on the movable plate lifting piece, the movable plate being fully drawn toward the front.

Referring to FIG. 4 and FIG. 14, in the process of the plate lifting protuberance 58 riding onto the movable plate lifting piece 51, the protuberances 57 of the elastically displaceable portions 55 provided on the movable plates 33 contact or ride on the slide guides 39 provided on the stationary plates 32. This causes the elastically displaceable portions 55 to be displaced outwardly away from the hard disk drive unit 17. Also, the slide guide tabs 64 jut out upwardly from the upper edge of the stationary plates 32 as the plate lifting protuberances 58 ride onto the plate lifting pieces 51.

Operation of the Mechanism for Loading/Unloading the Hard Disk Drive Unit

The operation of the mechanism for loading/unloading the hard disk drive unit constructed as discussed above will now be described. First, the operation for loading the hard disk drive unit 17 will be described, then the operation for pulling out or removing the hard disk drive unit 17 will be described.

Operation for Loading the Hard Disk Drive Unit

To load the hard disk drive unit 17 into the entertainment apparatus 1, the movable plates 33 are arranged so that the elastically displaceable portions 55 are displaced outwardly in the lateral direction substantially orthogonal to the direction in which the hard disk drive unit 17 is inserted into the mount assembly 46, and the slide guide tabs 64 project upwardly, as illustrated in FIGS. 3A and 3B and FIG. 4. In other words, a state is set such that the slide end positioning pieces 52 of the movable plates 33 are in contact with the insertion distal end surface 17a of the hard disk drive unit 17, as shown in FIGS. 3A and 3B. From this state, the hard disk drive unit 17 is inserted into the bay through an opening 65 formed in the entertainment apparatus 1. The hard disk drive unit 17 is inserted from one end which is opposite to the end where the interface connecting connector 37 is provided.

As the hard disk drive unit 17 is inserted toward the back of the mount assembly 46 through the opening 65, the elastically displaceable portions 55 displaced outwardly are slid while pressing inner side walls 46a of the mount assembly 46. At this time, the elastically displaceable portions 55 provided on the left in the insertion direction are on the bulging slide guides 39, so that their displacement is larger than that of the elastically displaceable portions 55 provided on the right in the insertion direction. This causes the hard disk drive unit 17 to be inserted while being pushed against the right inner side wall 46a of the mount assembly 46. The slide guide tabs 64 jutting out upward are slid while being pressed against the inner upper wall 46b of the mount assembly 46, as shown in FIGS. 3A and 3B.

Thus, when the hard disk drive unit 17 is inserted into the mount assembly 46, the hard disk drive unit 17 is pushed against the right inner side wall 46a of the mount assembly 46. This arrangement allows the hard disk drive unit 17 to be smoothly inserted in the mount assembly 46 even if there are some differences in the size of drives themselves.

Lastly, as shown in FIGS. 3A and 3B and FIG. 4, the hard disk drive unit 17 is secured to the mount assembly 46 by the pressing force applied by the elastically displaceable portions 55 to the inner side walls 46a and by the pressing force applied by the slide guide tabs 64 to the inner upper wall 46b. In the state wherein the hard disk drive unit 17 has been secured to the mount assembly 46, the plate positioning protuberances 61 provided on the plate fixing arms 60 are locked by being inserted in and engaged with the positioning holes 44 provided in the stationary plates 32. This locks the movable plates 33 and the stationary plates 32 so as to maintain the outward displacement of the elastically displaceable portions 55. As an alternative, the hard disk drive unit 17 may be secured to the mount assembly 46 by means of attaching the flanges 47 provided on the stationary plates 32 by screws or otherwise to the opening peripheral edge portion of the mount assembly 46.

Thus, the hard disk drive unit 17 is secured to the mount assembly 46 by the elastically displaceable portions 55 pressing against the inner side walls 46a of the mount assembly 46 and the slide guide tabs 64 pressing the inner upper wall 46b. This arrangement restrains malfunction of the hard disk drive unit 17 even if the entertainment apparatus 1 is subjected to vibration. Especially because the elastically displaceable portions 55 and the slide guide tabs 64 press against the inner walls of the mount assembly 46 in directions orthogonal to one another, the hard disk drive unit 17 is stably secured to the mount assembly 46.

Operation for Pulling Out the Hard Disk Drive Unit

Figure 5:
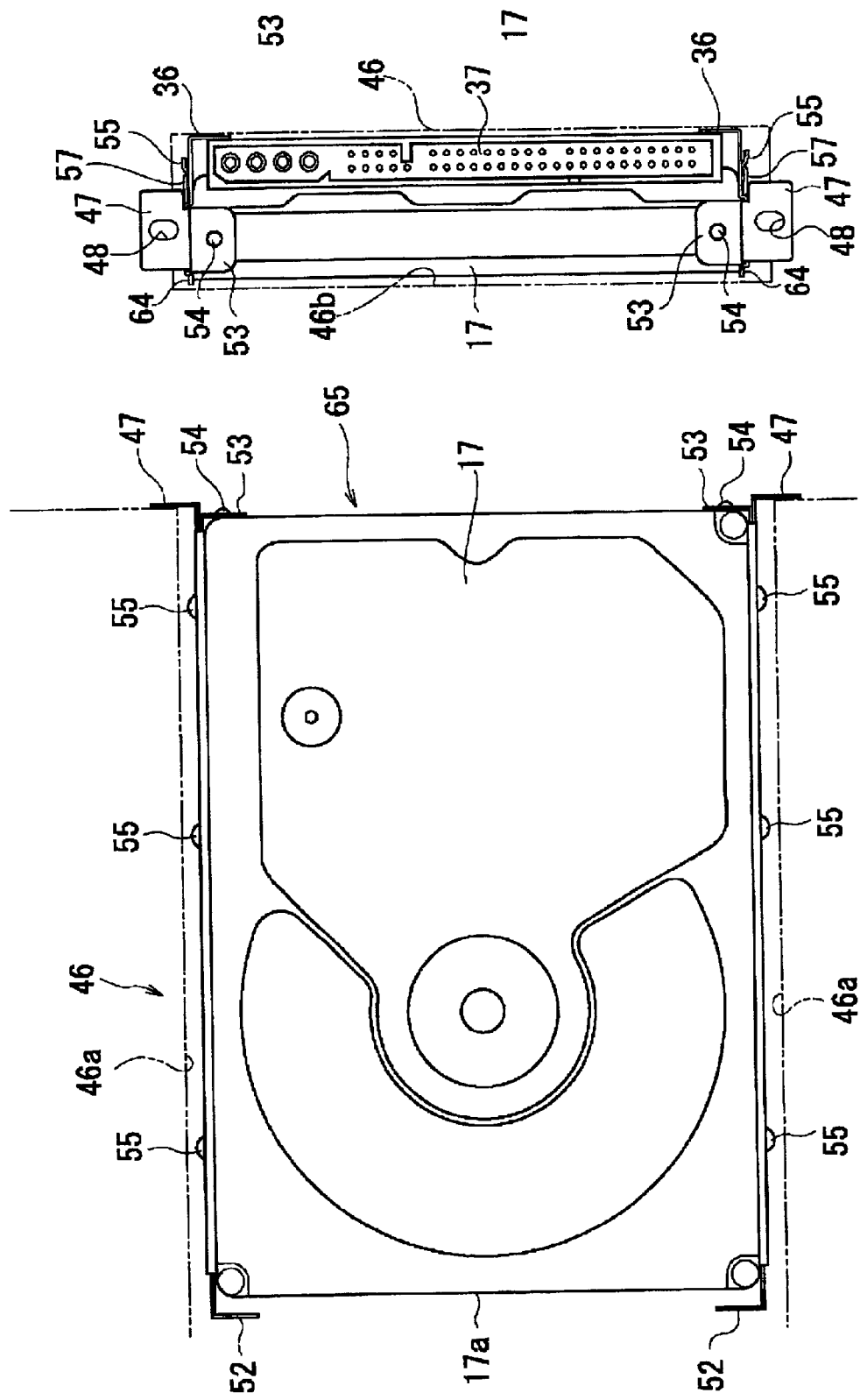
FIG. 5A is a top plan view showing the mechanism for loading/unloading a mountable unit in a state in which the movable plate has been pushed in toward the back to cause the elastically displaceable portion to be displaced inward.
FIG. 5B is a right end view showing the mechanism for loading/unloading a mountable unit in a state in which the movable plate has been pushed in toward the back to cause the elastically displaceable portion to be displaced inward.

To remove the hard disk drive unit 17 from the mounted and locked state illustrated in FIGS. 3A and 3B, the movable plates 33 are pushed in toward the back of the mount assembly 46, as shown in FIGS. 5A and 5B. This causes the plate positioning protuberances 61 provided on the movable plates 33 to come out of the positioning holes 44 of the stationary plates 32 to unlock the movable plates 33 from the stationary plates 32, as shown in FIG. 6, allowing the movable plates 33 to slide.

Figure 13:
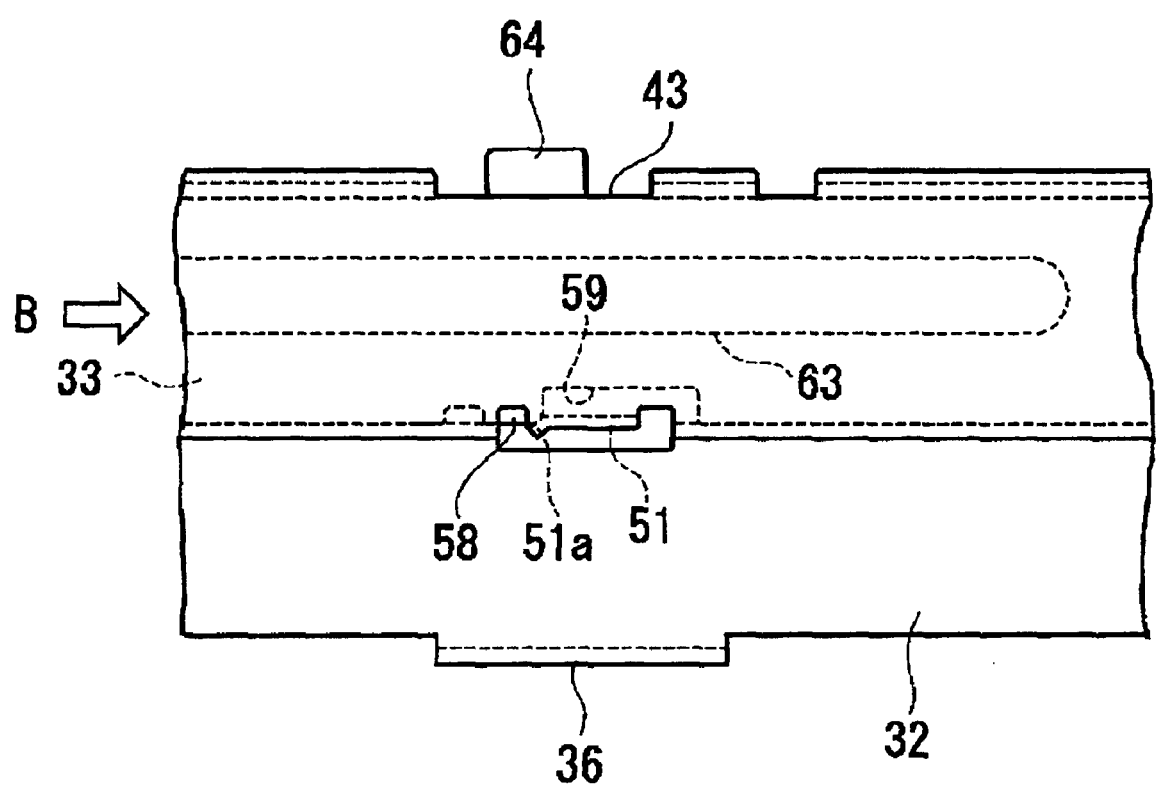
FIG. 13 is an enlarged top plan view of an essential section showing the plate lifting protuberance being in contact with the movable plate lifting piece in a state wherein the movable plate has been slid to the middle of travel toward the front where a connector for connection with an interface is provided.

As the movable plates 33 are pushed in toward the back of the mount assembly 46, the plate lifting protuberances 58 positioned on the movable plate lifting pieces 51 move down along the tapered portions 51a provided on the movable plate lifting pieces 51 in the opposite direction from the direction indicated by arrow C in FIG. 14 until they finally rest on the bent portions of the stationary plates 32, as shown in FIG. 12, via a state shown in FIG. 13. During this process, as shown in FIG. 6, the protuberances 57 provided on the distal ends of the elastically displaceable portions 55 leave the slide guides 39, and enter the relief holes 40 formed in the stationary plates 32.

As a result, the elastically displaceable portions 55 that have been pressing against the inner side walls 46a of the mount assembly 46 are displaced inwardly, toward the hard disk drive unit 17, and the elastically displaceable portions 55 are no longer in contact with the inner side walls 46a, as shown in FIGS. 5A and 5B. As the movable plates 33 are pushed in, the slide guide tabs 64 move down by one step from the projecting state so that they are no longer in contact with the inner upper wall 46b of the mount assembly 46, as shown in FIG. 6.

Figure 6:
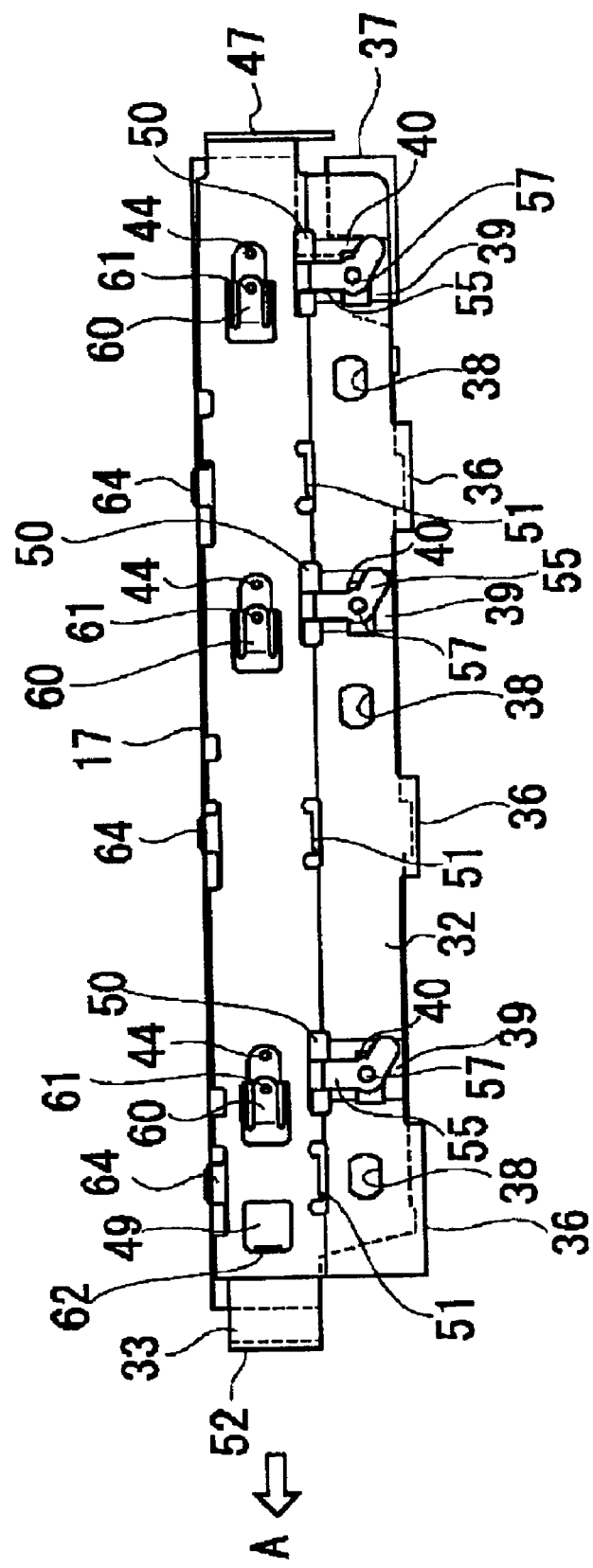
FIG. 6 is a side view showing the mechanism for loading/unloading a mountable unit in a state wherein the movable plate has been pushed in toward the back to cause the elastically displaceable portion to be displaced inward.

As the movable plates 33 are pushed in further toward the back, the slide positioning piece 62 provided on the movable plate 33 abuts against the peripheral edge of the slide restricting hole 49 formed in the stationary plate 32, as shown in FIG. 6. The abutting of the slide positioning piece 62 against the peripheral edge of the slide restricting hole 49 makes it impossible for the movable plate 33 to slide any further toward the back.

Thus, as the movable plate 33 is pushed in toward the back of the mount assembly 46, the contact between the elastically displaceable portions 55 and the inner side walls 46a of the mount assembly 46 is released, and the contact between the slide guide tabs 64 and the inner upper wall 46b is also released. Thus, the hard disk drive unit 17 can be easily removed from the mount assembly 46 by pulling the hard disk drive unit 17 toward the front.

Other Embodiments

In the embodiment described above, the hard disk drive unit 17 is installed in the extension bay of the entertainment apparatus 1. However, the same advantages can be obtained by detachably installing the hard disk drive unit 17 in an external case (mount assembly) separate from the entertainment apparatus 1. In this case, the external case may be connected to the entertainment apparatus 1 through the intermediary of a PC card interface provided on the rear surface of the entertainment apparatus 1.

In the embodiment described above, the stationary plates 32 and the movable plates 33 are attached to both side surfaces of the hard disk drive unit 17. Alternatively, however, the stationary plate 32 and the movable plate 33 may be provided only on one side surface of the hard disk drive unit 17.

Furthermore, in the foregoing embodiment, the hard disk drive unit 17 has been taken as an example of the mountable unit. The present invention, however, is not limited to the hard disk drive unit 17. As the mountable unit, an optical disc drive or the like may be used. Likewise, the target apparatus on which the mountable unit, such as the hard disk drive unit 17, is loaded is not limited to the entertainment apparatus 1. The target apparatus may be a personal computer or the like.

Alternatively, the hard disk drive unit 17 may be inserted from its connector 37 end into the extension bay of the entertainment apparatus 1. In this case, another connector that can be connected to the connector 37 of the hard disk drive unit 17 is provided at the back end of the extension bay.

When the hard disk drive unit 17 is inserted into the extension bay, the movable plates 33 may be in a state in which they are slidable with respect to the stationary plates 32, that is, the slide guide tabs 64 and the elastically displaceable portions 55 may be in a state in which they have been retracted toward the hard disk drive unit 17. In this case, after the hard disk drive unit 17 is inserted into the extension bay, the movable plates 33 are slid outward to cause the slide guide tabs 64 and the elastically displaceable portions 55 to jut out, thereby locking the hard disk drive unit 17 to the extension bay.

According to the embodiments of the present invention, it is possible to provide an inexpensive mountable unit loading/unloading mechanism and a plate unit that allows a mountable unit to be loaded or unloaded by a single motion and to be firmly locked when the mountable unit is installed. Moreover, even if there are individual differences in the size of the mountable units, the plate unit formed of the movable plates having the elastically displaceable portions and the stationary plates is able to accommodate the individual differences, enabling the mountable units to be quickly loaded into a target apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A set, comprising:
   a target apparatus including a mount assembly having an upper wall, a pair of side walls and an access opening;
   a mountable unit attachable to and detachable from the mount assembly through the access opening;
   a stationary plate adapted to be secured to the mountable unit;
   a movable plate adapted to be attached to the stationary plate and to be slidable with respect to the stationary plate in an insertion direction in which the mountable unit is inserted into the mount assembly and in a removal direction opposite to the insertion direction, the movable plate including an elastically displaceable portion having a protuberance;
   the stationary plate including a slide guide and a surface having a relief hole adapted to receive the protuberance, wherein
   movement of the mountable unit in the insertion direction into the mount assembly causes the protuberance of the elastically displaceable portion to contact the slide guide on the stationary plate, displacing the elastically displaceable portion outwardly in a lateral direction substantially orthogonal to the insertion direction and pressing the elastically displaceable portion into contact with at least one side wall of the mount assembly, thereby securing the mountable unit to the mount assembly, and
   movement of the movable plate in the insertion direction causes the protuberance of the elastically displaceable portion to locate in the relief hole in the stationary plate, displacing the elastically displaceable portion inwardly in the lateral direction to release the contact between the elastically displaceable portion and the at least one side wall of the mount assembly, thereby releasing the mountable unit for removal from the mount assembly.

2. The set according to claim 1, wherein the slide guide includes an outwardly bulging portion adapted to cause the elastically displaceable portion to displace further outwardly when the protuberance of the elastically displaceable portion rides on the outwardly bulging portion.

3. The set according to claim 1, wherein
   the stationary plate further includes a wall portion having an aperture,
   the slide guide is provided on a peripheral edge of the aperture, and
   the elastically displaceable portion is adapted to be inserted through the aperture and face an outer side of the stationary plate and to slide along the slide guide.

4. A set, comprising:
   a target apparatus including a mount assembly having an upper wall, a pair of side walls and an access opening;
   a mountable unit attachable to and detachable from the mount assembly through the access opening;
   a stationary plate adapted to be secured to the mountable unit; and
   a movable plate adapted to be attached to the stationary plate and to be slidable with respect to the stationary plate in an insertion direction in which the mountable unit is inserted into the mount assembly and in a removal direction opposite to the insertion direction, the movable plate including an elastically displaceable portion, wherein
   movement of the mountable unit in the insertion direction into the mount assembly displaces the elastically displaceable portion outwardly in a lateral direction substantially orthogonal to the insertion direction and presses the elastically displaceable portion into contact with at least one side wall of the mount assembly, thereby securing the mountable unit to the mount assembly, and
   movement of the movable plate in the insertion direction causes the elastically displaceable portion to displace inwardly in the lateral direction to release the contact between the elastically displaceable portion and the at least one side wall of the mount assembly, thereby releasing the mountable unit for removal from the mount assembly; and
   the mountable unit further including retaining means for retaining the elastically displaceable portion in an outwardly displaced configuration when the mountable unit is inserted into the mount assembly.

5. The set according to claim 4, wherein the retaining means comprises:
   a plate fixing member provided on the movable plate, the plate fixing member having a positioning protuberance; and
   a positioning aperture formed on the stationary plate and adapted to receive the positioning protuberance to engage the positioning protuberance in the positioning aperture.

6. A set, comprising:
   a target apparatus including a mount assembly having an upper wall, a pair of side walls and an access opening;
   a mountable unit attachable to and detachable from the mount assembly through the access opening;
   a stationary plate adapted to be secured to the mountable unit; and
   a movable plate adapted to be attached to the stationary plate and to be slidable with respect to the stationary plate in an insertion direction in which the mountable unit is inserted into the mount assembly and in a removal direction opposite to the insertion direction, the movable plate including an elastically displaceable portion and a projecting piece on an upper edge of the movable plate, the movable plate being displaceable in a direction substantially orthogonal to the insertion direction, wherein
   movement of the mountable unit in the insertion direction into the mount assembly displaces the elastically displaceable portion outwardly in a lateral direction substantially orthogonal to the insertion direction and presses the elastically displaceable portion into contact with at least one side wall of the mount assembly, thereby securing the mountable unit to the mount assembly,
   movement of the movable plate in the insertion direction causes the elastically displaceable portion to displace inwardly in the lateral direction to release the contact between the elastically displaceable portion and the at least one side wall of the mount assembly, thereby releasing the mountable unit from the mount assembly, and
   movement of the movable plate in the removal direction engages the projecting piece of the movable plate with the upper wall of the mount assembly, thereby locking the mountable unit to the mount assembly.

7. A set, comprising:
   a target apparatus including a mount assembly having an upper wall, a pair of side walls and an access opening;
   a mountable unit attachable to and detachable from the mount assembly through the access opening;
   a stationary plate adapted to be secured to the mountable unit, the stationary plate having a supporting surface; and
   a movable plate adapted to be attached to the stationary plate and to be slidable with respect to the stationary plate in an insertion direction in which the mountable unit is inserted into the mount assembly and in a removal direction opposite to the insertion direction, the movable plate including an elastically displaceable portion, a supported surface, and a projecting piece that projects in a predetermined direction substantially orthogonal to the insertion direction and to the lateral direction, wherein
   movement of the mountable unit in the insertion direction into the mount assembly displaces the elastically displaceable portion outwardly in a lateral direction substantially orthogonal to the insertion direction and presses the elastically displaceable portion into contact with at least one side wall of the mount assembly, thereby securing the mountable unit to the mount assembly,
   movement of the movable plate in the insertion direction causes the elastically displaceable portion to displace inwardly in the lateral direction to release the contact between the elastically displaceable portion and the at least one side wall of the mount assembly, thereby releasing the mountable unit for removal from the mount assembly,
   the supported surface of the movable plate slidably engaging the supporting surface of the stationary plate so that movement of the movable plate in the removal direction with respect to the stationary plate displaces the movable plate in the predetermined direction, and movement of the movable place in the insertion direction with respect to the stationary plate displaces the movable plate in a direction opposite the predetermined direction, and
   movement of the movable plate in the predetermined direction engages the projecting piece of the movable plate with the upper wall of the mount assembly, thereby locking the mountable unit to the mount assembly, and movement of the movable plate in the direction opposite the predetermined direction disengages the projecting piece of the movable plate from the upper wall of the mount assembly, thereby unlocking the mountable unit from the mount assembly.

8. A mountable unit attachable to and detachable from a mount assembly through an opening of a target apparatus, said mountable unit comprising:
   a stationary plate adapted to be secured to the mountable unit; and a movable plate adapted to be attached to the stationary plate and to be slidable with respect to the stationary plate in an insertion direction in which the mountable unit is inserted into the mount assembly and in a removal direction opposite to the insertion direction, the movable plate including an elastically displaceable portion having a protuberance;

the stationary plate including a slide guide and a surface having a relief hole adapted to receive the protuberance, wherein movement of the mountable unit in the insertion direction into the mount assembly causes the protuberance of the elastically displaceable portion to contact the slide guide on the stationary plate, displacing the elastically displaceable portion outwardly in a lateral direction substantially orthogonal to the insertion direction and pressing the elastically displaceable portion into contact with at least one side wall of the mount assembly, thereby securing the mountable unit to the mount assembly, and movement of the movable plate in the insertion direction causes the protuberance of the elastically displaceable portion to locate in the relief hole in the stationary plate, displacing the elastically displaceable portion inwardly in the lateral direction to release the contact between the elastically displaceable portion and the at least one side wall of the mount assembly, thereby releasing the mountable unit for removal from the mount assembly.

9. A plate unit adapted for loading a mountable unit into a mount assembly of a target apparatus, said plate unit comprising:

a stationary plate adapted to be secured to the mountable unit, the stationary plate having first and second ends;

a movable plate adapted to be slidably attached to the stationary plate, the movable plate including an elastically displaceable portion having a protuberance; and the stationary plate including a slide guide and a surface having a relief hole adapted to receive the protuberance, wherein movement of the movable plate toward the first end of the stationary plate causes the protuberance of the elastically displaceable portion to contact the slide guide on the stationary plate, displacing the elastically displaceable portion outwardly toward and into contact with the mount assembly, and movement of the movable plate toward the second end of the stationary plate causes the protuberance to locate in the relief hole in the stationary plate, displacing the elastically displaceable portion inwardly away from the mount assembly and releasing the contact between the elastically displaceable portion and the mount assembly.

* * * * *

UNITED STATES PATENT AND TRADEMARK OFFICE
CERTIFICATE OF CORRECTION

PATENT NO. : 6,888,718 B2
DATED : May 3, 2005
INVENTOR(S) : Takashi Nakamura

It is certified that error appears in the above-identified patent and that said Letters Patent is hereby corrected as shown below:

Column 10,
Line 15, "of drives" should read -- of the drives --.

Column 14,
Line 50, "place" should read -- plate --.

Signed and Sealed this

Sixth Day of September, 2005

JON W. DUDAS
*Director of the United States Patent and Trademark Office*